(12) United States Patent
Yumoto

(10) Patent No.: US 11,745,407 B2
(45) Date of Patent: Sep. 5, 2023

(54) RESIN CONTAINER MANUFACTURING DEVICE

(71) Applicant: NISSEI ASB MACHINE CO., LTD., Nagano (JP)

(72) Inventor: Haruhito Yumoto, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 162 days.

(21) Appl. No.: 17/602,385

(22) PCT Filed: Apr. 8, 2020

(86) PCT No.: PCT/JP2020/015836
§ 371 (c)(1),
(2) Date: Oct. 8, 2021

(87) PCT Pub. No.: WO2020/209287
PCT Pub. Date: Oct. 15, 2020

(65) Prior Publication Data
US 2022/0161480 A1    May 26, 2022

(30) Foreign Application Priority Data
Apr. 9, 2019 (JP) .................. 2019-074083

(51) Int. Cl.
*B29C 49/64* (2006.01)
*B29C 49/42* (2006.01)

(52) U.S. Cl.
CPC ...... *B29C 49/6409* (2013.01); *B29C 49/4289* (2013.01)

(58) Field of Classification Search
CPC ............ B29C 49/6409; B29C 49/6845; B29C 49/6855; B29C 49/42382; B29C 49/42378
See application file for complete search history.

(56) References Cited

U.S. PATENT DOCUMENTS

| 2006/0110483 A1 | 5/2006 | Damerow et al. |
| 2014/0079839 A1 | 3/2014 | Finger et al. |
| (Continued) | | |

FOREIGN PATENT DOCUMENTS

| GB | 1 372 925 A | 11/1972 |
| JP | 6-87135 A | 3/1994 |
| (Continued) | | |

OTHER PUBLICATIONS

Office Action dated Feb. 26, 2023 in Chinese family member application No. 202080040669.7. This document is being submitted for its characterization of the cited documents above as category "Y" and the Examiner's consideration is respectfully requested on that basis.

(Continued)

*Primary Examiner* — Robert B Davis
(74) *Attorney, Agent, or Firm* — GREENBLUM & BERNSTEIN, P.L.C.

(57) ABSTRACT

The apparatus for manufacturing a resin container includes a heating unit configured to heat a preform using heaters and, a blow molding unit configured to blow-mold the preform that has been heated, accumulators that are connected to the blow molding unit and for storing a pressurized gas to be used for blow molding, and a connection pipe that connects the heating unit and the accumulators via an electrically driven valve, in which the electrically driven valve is closed when electric power is supplied, and is opened when electric power is not supplied to cause the gas in the accumulators to flow to the heating unit.

4 Claims, 3 Drawing Sheets

(56) References Cited

U.S. PATENT DOCUMENTS

2016/0368197 A1* 12/2016 Takahashi ............ B29D 22/003
2017/0043521 A1*  2/2017 Ulutürk .................. B29C 49/68

FOREIGN PATENT DOCUMENTS

| JP | 6-315973 A | 11/1994 |
| JP | 11-192658 A | 7/1999 |
| JP | 2002-264194 A | 9/2002 |
| JP | 2006-070901 A | 3/2006 |
| JP | 2010-221705 A | 10/2010 |
| JP | 2012-135913 A | 7/2012 |
| WO | 2012/057016 A1 | 5/2012 |
| WO | WO-2022014716 A1 * | 1/2022 |

OTHER PUBLICATIONS

International Search Report issued in International Patent Application No. PCT/JP2020/015836, dated Jun. 30, 2020, along with an English translation thereof.

Written Opinion of the International Searching Authority issued in International Patent Application No. PCT/JP2020/015836, dated Jun. 30, 2020, along with an English translation thereof.

Office Action issued in Indian Patent Application No. 202117050774 dated Mar. 17, 2022, along with English translation thereof.

* cited by examiner

RESIN CONTAINER MANUFACTURING DEVICE

BACKGROUND OF THE INVENTION

Field of the Invention

The present invention relates to an apparatus for manufacturing a resin container.

Description of the Related Art

Conventionally, there has been known an apparatus for manufacturing a resin container including a heating unit that adjusts a temperature of a preform and a blow molding unit that blow-molds the preform whose temperature has been adjusted by the heating unit (see, for example, JP 6-315973A). This type of apparatus for manufacturing a resin container includes the heating unit in a step before the blow molding unit. Thus, even in a case of manufacturing a bottle container using a preform cooled to room temperature, the preform can be heated by the heating unit before blow molding, and thus the temperature of the preform can be adjusted to a temperature suitable for blow molding.

However, since the apparatus for manufacturing a resin container according to the above-described conventional technique operates using electric power, there have been cases where the operation is stopped due to a power failure or the like, but in the current situation, the apparatus for manufacturing a resin container does not take much safety measures against the power failure.

The heating unit for heating the preform has a substantially box-shaped frame, and in this frame, there are provided an infrared lamp for heating the preform, a cooling device for preventing overheating of the preform and the infrared lamp, and a blower that is a mechanism for supplying or discharging air used for adjusting an ambient temperature in the heating unit. Since these are operated by electric power, in the heating unit, when the supply of electric power is stopped due to a power failure, supply and discharge of air are stopped, and the ambient temperature of the heating unit is significantly raised due to remaining heat of the infrared lamp, or the like. Consequently, the preform that has been conveyed and stopped in the heating unit due to power failure or the like is excessively heated and melted due to remaining heat, and there has been a possibility of causing adverse effects such as contact and adhesion of the melted resin to peripheral devices.

Further, an excessive temperature rise may cause damage to the infrared lamp or even deformation of a light shielding plate for preventing infrared rays emitted from the infrared lamp from leaking to the outside. Furthermore, when such a failure occurs in the heating unit, it takes time to perform recovery work, and in some cases, it is necessary to replace parts. Therefore, it has been necessary to equip the current apparatus for manufacturing a resin container with a safety countermeasure mechanism capable of suppressing a failure of the heating unit at the time of power failure.

SUMMARY OF THE INVENTION

The present invention includes a heating unit configured to heat a preform using a heater, a blow molding unit configured to blow-mold the preform that has been heated, an accumulator that is connected to the blow molding unit and for storing a pressurized gas to be used for blow molding, and a connection pipe that connects the heating unit and the accumulator via an electrically driven valve, in which the electrically driven valve is closed when electric power is supplied, and is opened when electric power is not supplied to cause the gas in the accumulator to flow to the heating unit.

In this case, the accumulator may include a first accumulator and a second accumulator that stores a gas having a pressure lower than that of the first accumulator, and the connection pipe is connected to the second accumulator. The heating unit may bring the gas heated by the heater into contact with the preform using an air blower. The connection pipe may be connected to a discharge-side pipe of the air blower.

Further features of the present invention will become apparent from the following description of exemplary embodiments with reference to the attached drawings.

DESCRIPTION OF THE EMBODIMENTS

Hereinafter, a preferred embodiment of the present invention will be described with reference to the drawings.

Figure 1:
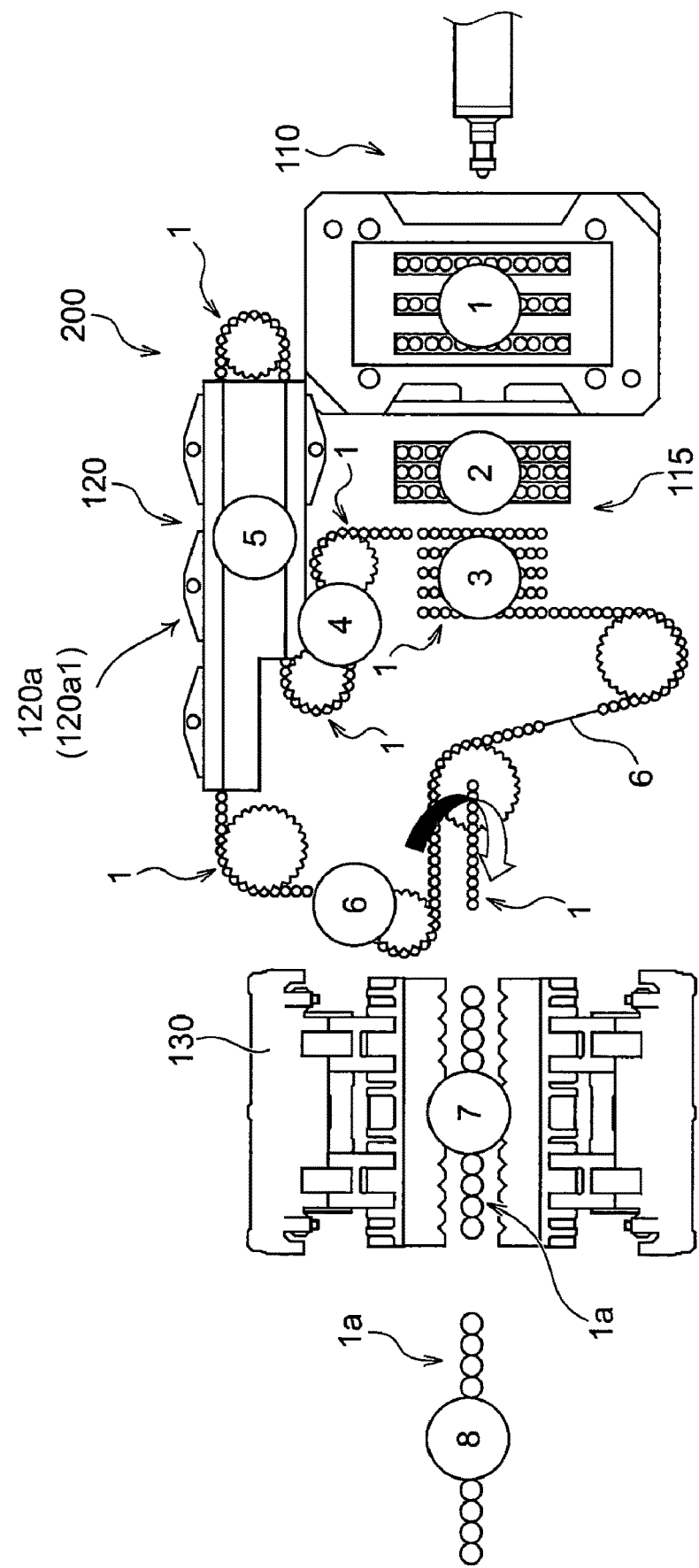
FIG. 1 illustrates a schematic diagram of a blow molding apparatus according to an embodiment of the present invention.
Figure 2:
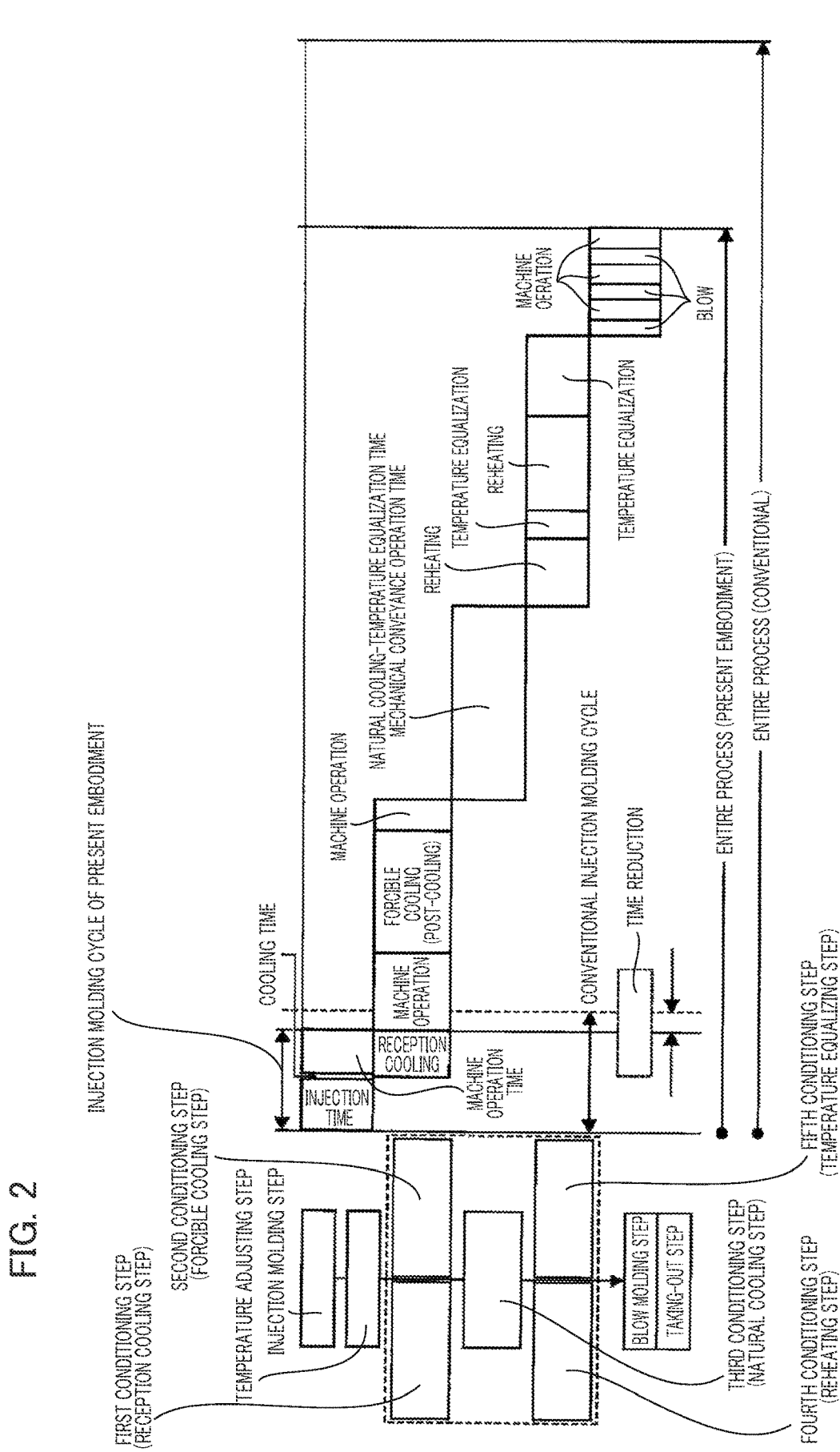
FIG. 2 illustrates a process diagram of an entire process.

FIG. 1 illustrates a schematic diagram of a blow molding apparatus, and FIG. 2 illustrates a process diagram of an entire process.

In FIG. 1, step 1 represents a preform molding step, step 2 represents a preform post-cooling step, steps 3 and 4 represent a preform temperature equilibration step, step 5 represents a reheating step, step 6 represents a temperature equalizing step, step 7 represents a stretch blow molding step, and step 8 represents a container taking-out step.

As illustrated in FIG. 1, the blow molding apparatus (apparatus for manufacturing a resin container) 200 according to the present embodiment is configured such that preforms 1 are sequentially conveyed on a rail (conveyance path) 6 and undergoes respective steps of an injection molding station 110, a post-cooling station 115, a temperature adjustment station (heating unit) 120, a stretch blow station (blow molding unit) 130, and a taking-out station. Thus, the blow molding apparatus 200 sequentially cools and adjusts the temperature of the conveyed preforms 1. Note that the post-cooling station 115 is included in a part of the temperature adjustment station 120 in a broad sense, and is particularly a station responsible for forcible cooling of the preforms 1.

The blow molding apparatus 200 blow-molds the preforms 1 injection-molded in the injection molding station 110 by dividing into a plurality of times without collectively adjusting the temperature or performing blow molding at once. That is, it is provided such that, for example, while the injection molding station 110 injection-molds 36 preforms 1 at once, 12 preforms 1 are conveyed at a time to the temperature adjustment station 120 by the rail 6 and temperature-adjusted, and thereafter, for example, 12 preforms 1 are blow-molded at a time in the stretch blow station 130. The preforms 1 injection-molded in the injection molding station 110 are cooled in steps 2 to 4, and thus it is structured such that the preforms 1 are heated using an infrared lamp in the temperature adjustment station 120 after the post-cooling step. Note that one molding cycle time of the blow molding apparatus 200 can be regarded as substantially the same as an injection molding time of the preforms 1. Further, the number of times of blow molding per molding cycle time is desirably three, but is not limited thereto. That is, the number of times of blow molding may be any number of times as long as the injection molded preforms for one batch are divided into a plurality of times.

The preforms 1 injection-molded by the blow molding apparatus 200 are released from the injection molding station 110 in a soft state (in a high temperature state to such an extent that an outer shape can be maintained) with heat at a higher temperature than the glass transition point of a synthetic resin material (for example, PET resin). That is, the blow molding apparatus 200 takes out the preforms 1 from an injection molding cavity mold in the injection molding station 110 before outer surface temperatures of the preforms 1 molded in the injection molding station 110 become higher than inner surface temperatures, and cools the preforms 1 by 10° C. or more and 50° C. or less in the preform post-cooling step in step 2 and the preform temperature equilibration step in steps 3 and 4. Thus, the preforms 1 that have stored heat from injection molding are molded into final containers 1a at the stretch blow station 130 while utilizing residual heat.

As illustrated in FIG. 2, the blow molding apparatus 200 shortens the injection molding step and shortens a preform molding cycle (injection molding cycle) by a post-cooling function using a conditioning pot mold in a temperature adjustment step. At this time, in the injection molding station 110 for molding the preforms 1, the cooling time is set to ⅔ or less, ½ or less, or ⅓ or less of an injection time (filling time), or preferably approximately 0 (zero) seconds.

Each step will be described below.

First, in the injection molding step, as illustrated in FIG. 2, the blow molding apparatus 200 injects (fills) the material into a molding space of an injection molding mold set to 5° C. or more and 20° C. or less over a predetermined injection time, and completes the injection molding of the preforms 1 after a short predetermined cooling time as close to 0 (zero) seconds as possible is interposed. Next, the blow molding apparatus 200 takes out (release) the preforms 1 from the injection molding station 110 to a reception pot mold (not illustrated) over a predetermined machine operation time (step 1 of FIG. 1 and injection molding step of FIG. 2). For example, the injection time (filling time) is set to 3.0 seconds to 3.5 seconds, and the cooling time is set to 0.5 seconds to 1.0 seconds.

A machine operation time in the injection molding station 110 (FIG. 1) is a mold opening-closing time of the injection molding mold, and is a time for transferring the preforms 1 from the injection molding mold to the reception pot mold. The machine operation time is set to, for example, 3.5 seconds or more and 4.0 seconds or less. When the preforms 1 are taken out and conveyed by a mechanical operation of an injection mold opening-closing mechanism (not illustrated) or the reception pot mold, the preforms 1 are cooled by contact with ambient air or the reception pot mold, and thus reception and forcible cooling of the preforms 1 are substantially combined in the conditioning step (first conditioning step (reception cooling step) in FIG. 2). At this time, the injection molding time (total of injection time, cooling time, and machine operation time) of the present embodiment is set to be shorter than the injection molding time (conventional injection molding cycle) of prior art (for example, WO 2012-057016 A).

When the reception cooling step is performed, the blow molding apparatus 200 (FIG. 1) retracts the preforms 1 from the injection molding station 110 while keeping the preforms 1 in the reception pot mold, and transfers the preforms 1 to the temperature adjustment station 120 by a conveyance member (not illustrated). Temperature equalization processing of the preforms 1 is performed using the machine operation time. At this time, an outer layer (skin layer) of a preform 1 is increased by 80° C. or more as compared with the temperature immediately after release of the injection molding station 110 by heat transfer from an inner layer (core layer).

When the first conditioning step is completed, the blow molding apparatus 200 performs a forcible cooling step (post-cooling step) on the preforms 1 carried into a conditioning cavity mold (cooling pot mold) of the temperature adjustment station 120, more precisely, the post-cooling station 115 (step 2 of FIG. 1 and a second conditioning step (forcible cooling step) of FIG. 2). The preforms 1 come into contact with the conditioning cavity mold set to a glass transition temperature of a material or lower (for example, 60° C. or lower) on an outer surface side, and is forcibly cooled.

When the second conditioning step is completed, the blow molding apparatus 200 (FIG. 1) transfers the preforms 1 to the conveyance member (not illustrated) waiting on the rail 6 by a machine operation such as inversion and lowering of the conditioning cavity mold (step 3 in FIG. 1). Next, the preforms 1 are transferred to the temperature adjustment station 120 along the rail 6 together with the conveyance member by mechanical operation using an electric motor, a sprocket, or the like (step 4 in FIG. 1). During this machine operation time (for example, 3.5 seconds or more and 4.0 seconds or less), the blow molding apparatus 200 subjects the preforms 1 to natural cooling and temperature equalization in the temperature adjustment station 120 from immediately after the end of the post-cooling step to immediately before the start of the reheating step (third conditioning step (natural cooling step) in FIG. 2).

When the preforms 1 are subjected to the cooling and temperature equalization in the third conditioning step, the blow molding apparatus 200 performs heating and temperature equalization in the order of reheating, temperature equalization, and reheating on the preforms 1 (step 5 of FIG. 1 and fourth conditioning step (reheating step) of FIG. 2) in the reheating step (reheating station 120a) of the temperature adjustment station 120.

When the preforms 1 are subjected to the heating and temperature equalization in the order of reheating, temperature equalization, and reheating, the blow molding apparatus 200 performs temperature equalization on the preforms 1 by conveying in the atmosphere along the rail 6, and then carries the preforms 1 into the blow molding station 130 (step 6 of FIG. 1 and fifth conditioning step (temperature equalizing step) of FIG. 2). Heat transfer is caused to occur between the inner and outer layers (between the skin layer and the core layer) or in a thickness direction of a body portion 2b of the preform 1 to reduce the temperature difference between the inner and outer layers immediately before blow molding, so that the temperature distribution of the preforms 1 are equilibrated and stabilized, and thus the temperature condition of the preforms 1 immediately before the blow molding can be optimized. Note that the time of this step is set to, for example, about 1.0 seconds or more and 2.0 seconds or less.

When the preforms 1 are carried into the blow molding station 130, the blow molding apparatus 200 blow-molds the preforms 1 to mold the containers 1a in the blowing step (step 7 in FIG. 1 and blow molding step in FIG. 2).

When the preforms 1 are blow-molded to mold the containers 1a, the blow molding apparatus 200 takes out the containers 1a by a machine operation (step 8 in FIG. 1 and taking-out step in FIG. 2). Note that in the present embodiment, the conditioning step, the natural cooling step, the reheating step, and the blowing step are performed, for M preforms 1 (for example, 36 preforms 1) injected at once in the injection step, on N preforms (12 preforms) at a time that is smaller than the M preforms 1. At this time, the conditioning step, the natural cooling step, and the reheating step are continuously performed as the preforms 1 are conveyed along the rail 6, but the blow molding is performed on 12 preforms at a time for 3 times in the blowing step.

According to the above steps, the time required for the entire process in which the cycle by the blow molding apparatus 200 is shortened is shorter than the time required for the entire process by a conventional apparatus.

Figure 3:
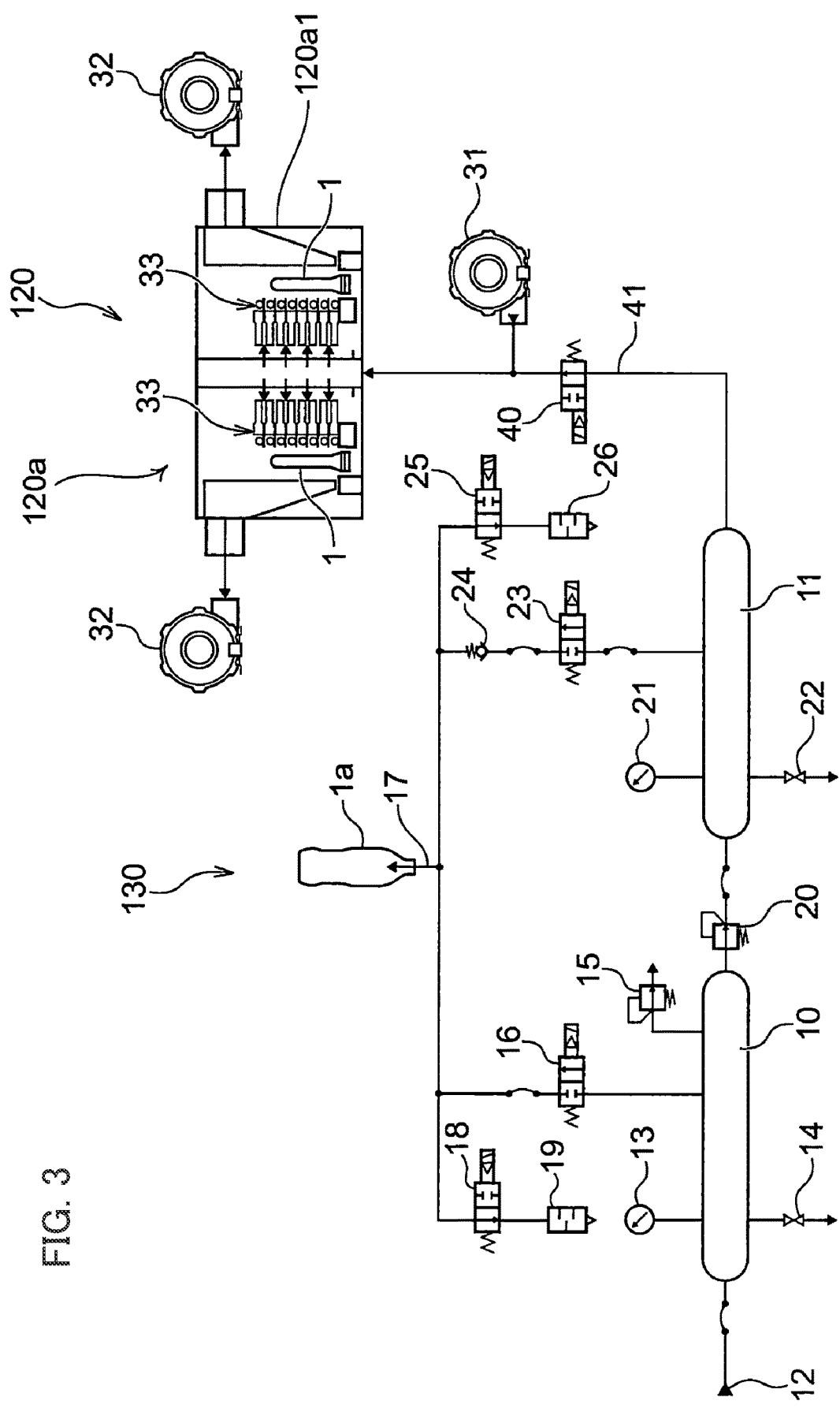
FIG. 3 illustrates a circuit diagram of a pipe connected to an accumulator.

FIG. 3 illustrates a circuit diagram of a pipeline connected to an accumulator.

As illustrated in FIG. 3, the stretch blow station 130 includes a first accumulator 10 and a second accumulator 11. Note that the preforms 1 are first blown by low pressure compressed air stored in the second accumulator 11, then blown by high pressure compressed air stored in the first accumulator 10, and molded into the containers 1a.

The first accumulator 10 is connected to an air pressure source 12 so that compressed air of at most 3.5 MPa is supplied and stored from the air pressure source 12. The first accumulator 10 is provided with a pressure gauge 13 for measuring an internal pressure, a gate valve 14 for discharging unnecessary compressed air, and a relief valve 15 for releasing the compressed air to the atmosphere when the pressure of the stored compressed air becomes 3.8 MPa or more so that the pressure in the first accumulator 10 does not become too high.

The first accumulator 10 is connected via a normally closed first electromagnetic valve 16, which is a solenoid valve, to a nozzle 17 to be inserted into the preform 1 that has been conveyed into the stretch blow station 130. Thus, the first accumulator 10 is provided to hold the stored compressed air when the first electromagnetic valve 16 is not energized and closed, but to discharge the stored compressed air from the nozzle 17 when the first electromagnetic valve 16 is energized and opened. The preform 1 conveyed into the stretch blow station 130 is expanded by the compressed air discharged from the nozzle 17 and pressed against a mold surface of a blow mold that is not illustrated.

The pipe between the first electromagnetic valve 16 and the nozzle 17 is branched, and a silencer 19 is connected to the branched pipe via a normally open second electromagnetic valve 18 that is a solenoid valve. Thus, when the second electromagnetic valve 18 is energized and closed, the compressed air does not flow through the second electromagnetic valve 18, but when the second electromagnetic valve 18 is not energized and opened, the compressed air accumulated in the pipe between the first electromagnetic valve 16 and the nozzle 17 is discharged from the silencer 19.

The first accumulator 10 is also connected to the second accumulator 11 via a pressure reducing valve 20. Thus, the compressed air supplied from the air pressure source 12 to the second accumulator 11 via the first accumulator 10 and the pressure reducing valve 20 has a lower pressure (for example, 1.5 MPa) than the compressed air stored in the first accumulator 10. This second accumulator 11 is provided with a pressure gauge 21 for measuring an internal pressure and a gate valve 22 for discharging unnecessary compressed air.

The second accumulator 11 is connected to a nozzle 17 inserted into the preform 1 conveyed into the stretch blow station 130 via a normally closed third electromagnetic valve 23 that is a solenoid valve and a check valve 24. Thus, the second accumulator 11 is provided to hold the stored compressed air when the third electromagnetic valve 23 is not energized and closed, but to discharge the stored compressed air from the nozzle 17 when the third electromagnetic valve 23 is energized and opened. The preform 1 conveyed into the stretch blow station 130 is expanded by the compressed air discharged from the nozzle 17 and pressed against a mold surface of a blow mold that is not illustrated. Here, the third electromagnetic valve 23 is connected to the first electromagnetic valve 16 on the side of the first accumulator 10 to share the nozzle 17, but since the check valve 24 is interposed, the high-pressure compressed air does not reach the third electromagnetic valve 23 even if the high-pressure compressed air flows from the first accumulator 10.

The pipe between the third electromagnetic valve 23 and the nozzle 17 is branched, and a silencer 26 is connected to the branched pipe via a normally open fourth electromagnetic valve 25 that is a solenoid valve. Thus, when the fourth electromagnetic valve 25 is energized and closed, the compressed air does not flow through the fourth electromagnetic valve 25, but when the second electromagnetic valve is not energized and opened, the compressed air accumulated in the pipe between the third electromagnetic valve 23 and the nozzle 17 is discharged from the silencer 26.

The temperature adjustment station 120, more specifically, the reheating station 120a includes an air supply blower 31 and exhaust blowers 32 and 32.

The air supply blower 31 is provided to blow cooling air into a heating device (heating box) 120a1 of the reheating station 120a through a pipe. The cooling air blown into the heating device 120a1 is guided between a pair of conveyance paths for conveying the preforms 1 in opposite directions, and then blown into respective conveyance paths. At this time, the blown cooling air flows through the infrared lamps (heaters) 33 and 33 arranged in the respective conveyance paths and is heated to become heated air (heating atmosphere), and is blown so as to be in contact with the preforms 1. Thus, the preforms 1 are heated by the heated air in addition to infrared rays (electromagnetic waves) output from the infrared lamps (heaters) 33 and 33, thereby adjusting the temperature of the preforms 1. Further, when the blow molding apparatus 200 is energized, overheating of the infrared lamps (heaters) 33 and 33 and the heated air in the heating device 120a1 is suppressed by blowing air from the air supply blower 31 and the exhaust blower 32 (described later) which are cooling devices.

The exhaust blowers 32 and 32 are disposed so as to sandwich the pair of conveyance paths, and are provided so as to suck out the heated air blown so as to be in contact with the preform 1 from the air supply blower 31.

In the reheating station 120a1 (broadly, the temperature adjustment station 120), a connection pipe 41 connecting the discharge side of the air supply blower 31 and the inside of the reheating station 120a1 is connected to the second accumulator 11 of the stretch blow station 130 via a fifth electromagnetic valve (electrically driven valve) 40. The fifth electromagnetic valve 40 is a normally open solenoid valve, and is configured to close when energized but to circulate the compressed air stored in the second accumulator 11 when not energized. Thus, when the fifth electromagnetic valve 40 is not energized, the compressed air stored in the second accumulator 11 is supplied into the reheating station 120a1 through the connection pipe 41 connected to the discharge side of the air supply blower 31, and is blown so as to be in contact with the preform 1.

The blow molding apparatus 200 according to the present embodiment includes a reheating station 120a1 (broadly, a temperature adjustment station 120) that heats a preform 1 by using the infrared lamps 33 and 33, a stretch blow station 130 that blow-molds the preform 1 that has been heated, accumulators 10 and 11 that are connected to the stretch blow station 130 and for storing compressed air to be used for blow molding, and a connection pipe 41 that connects the reheating station 120a1 and the accumulators 10 and 11 via a fifth electromagnetic valve 40, in which the fifth electromagnetic valve 40 is closed when electric power is supplied and is opened when electric power is not supplied to cause the compressed air in the accumulators 10 and 11 to flow to the reheating station 120a1. Thus, when the supply of power to the blow molding apparatus 200 is stopped due to a power failure or the like, the first electromagnetic valve 16 and the third electromagnetic valve 23 are closed and the fifth electromagnetic valve 40 is opened, so that the inside of the reheating station 120a1 can be cooled using the compressed air stored in the accumulators 10 and 11. Therefore, it is possible to prevent a defect (melting of the preform 1, breakage of the infrared lamp 33, or the like) from occurring in the reheating station 120a1 when the supply of power is stopped. Further, since existing components such as the pipe connecting the accumulators 10 and 11, the air supply blower 31, and the inside of the reheating station 120a1 are mainly used, the present invention can also be applied to an existing blow-molding apparatus without major modification. Note that a flow regulating valve (not illustrated) may be provided between the connection pipe 41 and the fifth electromagnetic valve 40. Thus, the flow amount (degree of cooling) of the compressed air can be appropriately changed according to the degree of temperature rise of the reheating station 120a1, and the compressed air in the accumulators 10 and 11 can be more effectively used until power failure recovery.

Although the present invention has been described on the basis of the embodiment, the present invention is not limited thereto. For example, in the above embodiment, the two accumulators 10 and 11 are provided, but the present invention is not limited thereto. The number of accumulators may be one or three or more as long as a compressed gas can be stored.

Further, in the above embodiment, compressed air is stored in the accumulators 10 and 11, but the present invention is not limited thereto. Other gases may be used as long as they can be used for blow molding and cooling of the temperature adjustment station.

The invention claimed is:

1. An apparatus for manufacturing a resin container, comprising:
   a heating unit configured to heat a preform using a heater;
   a blow molding unit configured to blow-mold the preform that has been heated;
   an accumulator that is connected to the blow molding unit and for storing a pressurized gas to be used for blow molding; and
   a connection pipe that connects the heating unit and the accumulator via an electrically driven valve,
   wherein the electrically driven valve is closed when electric power is supplied, and is opened when electric power is not supplied to cause the gas in the accumulator to flow to the heating unit.

2. The apparatus for manufacturing the resin container according to claim 1, wherein the accumulator includes a first accumulator and a second accumulator that stores a gas having a pressure lower than that of the first accumulator, and the connection pipe is connected to the second accumulator.

3. The apparatus for manufacturing the resin container according to claim 1, wherein the heating unit brings the gas heated by the heater into contact with the preform by using an air blower.

4. The apparatus for manufacturing the resin container according to claim 3, wherein the connection pipe is connected to a discharge-side pipe of the air blower.

* * * * *